United States Patent Office.

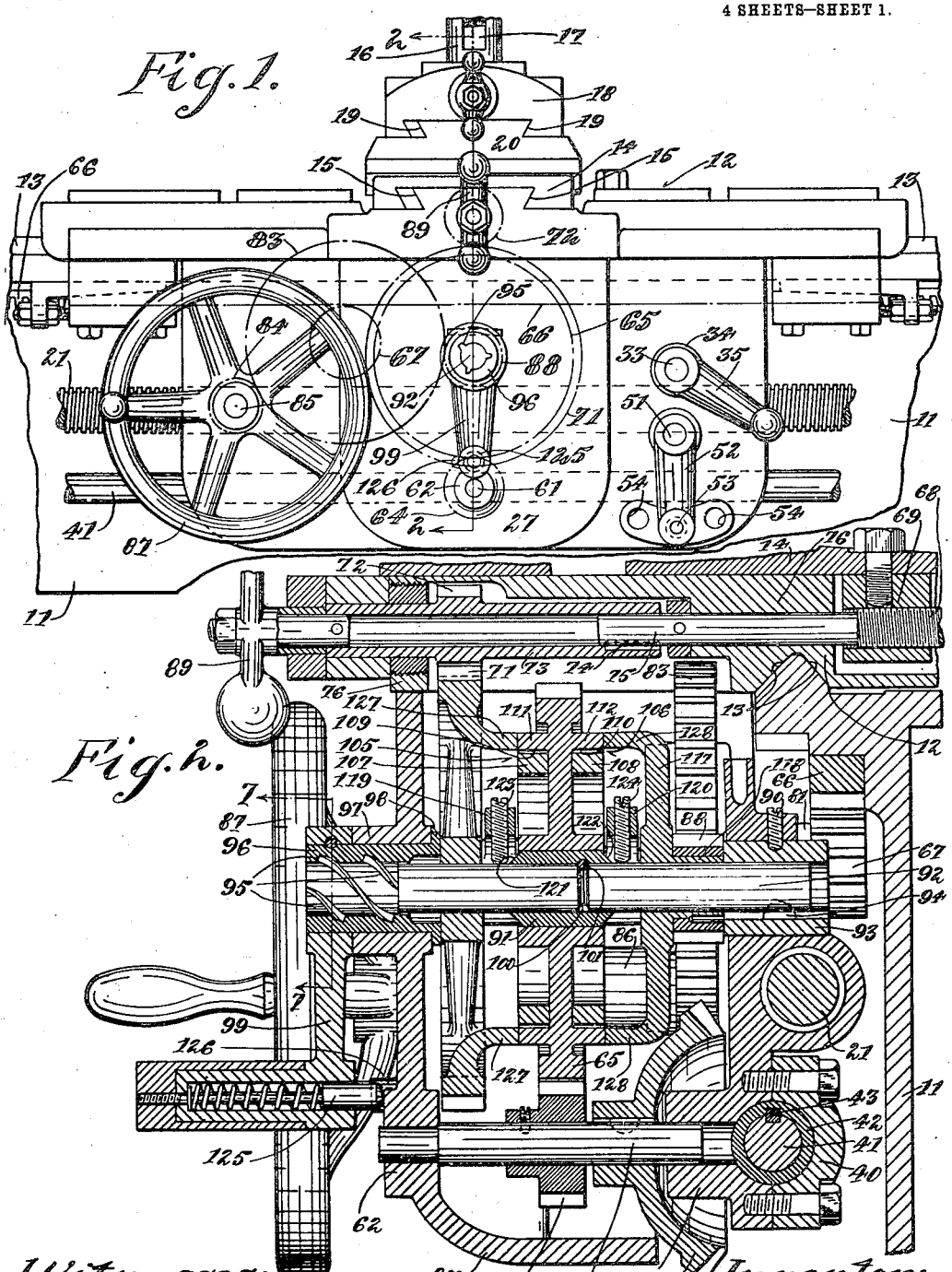

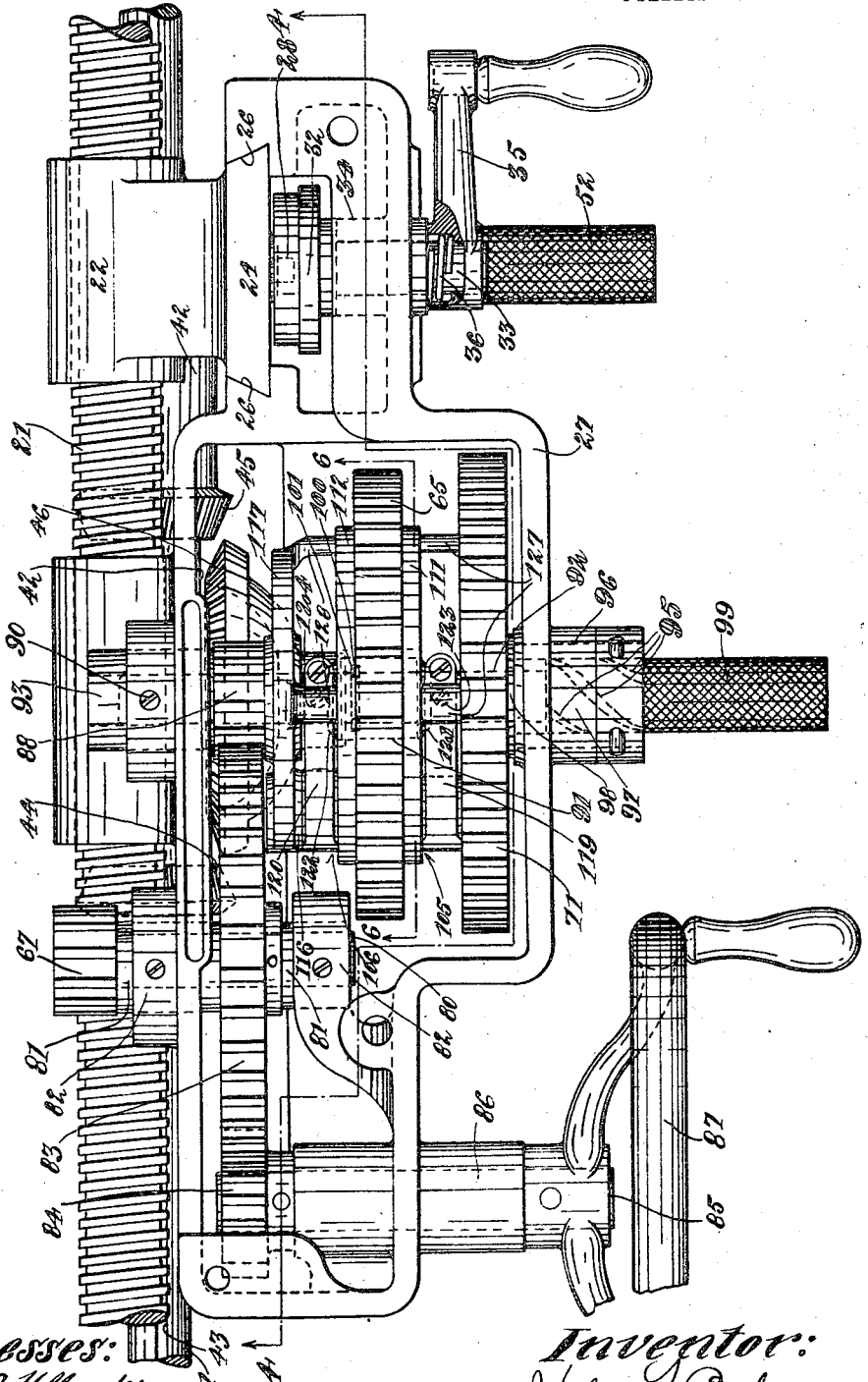

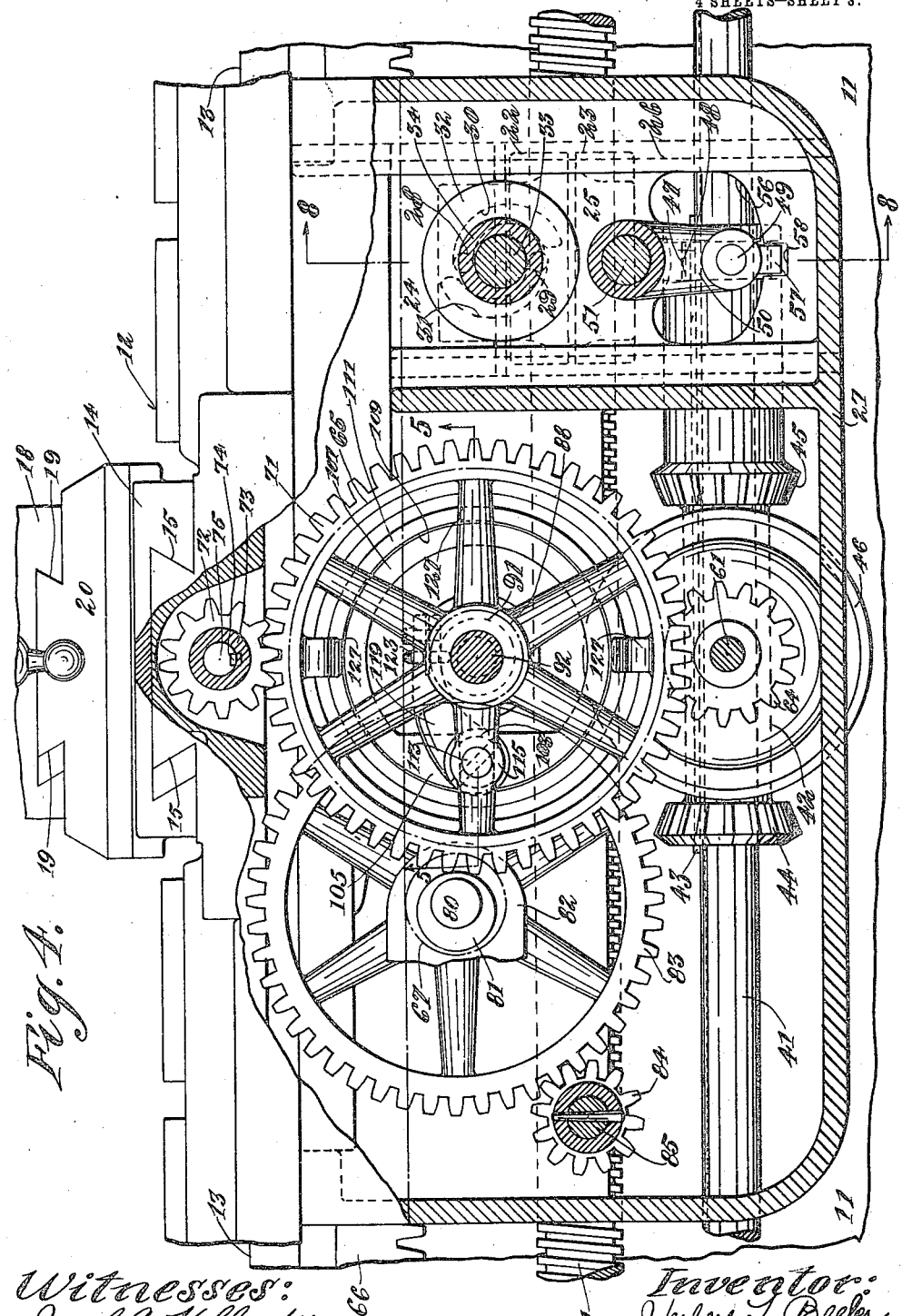

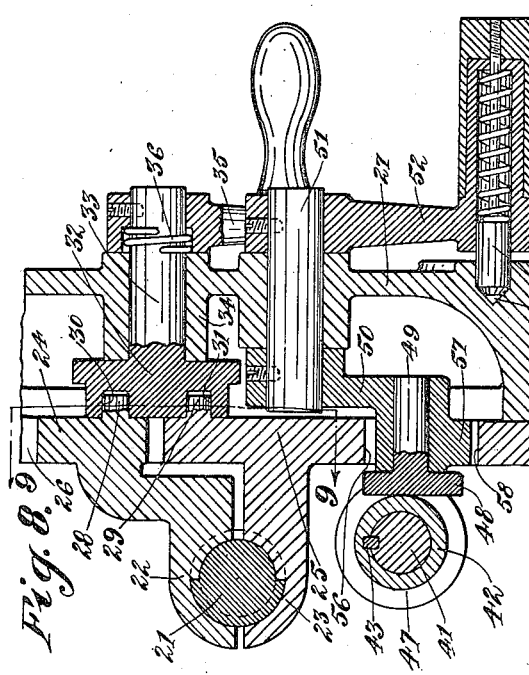
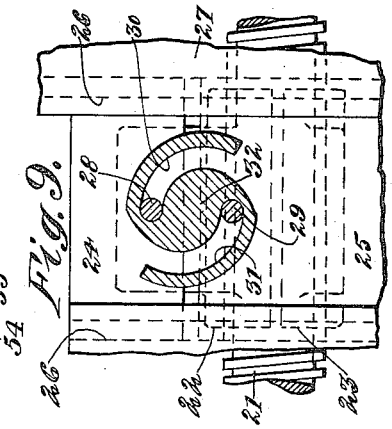
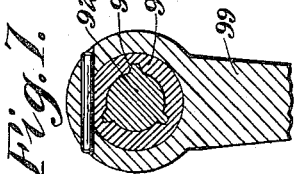
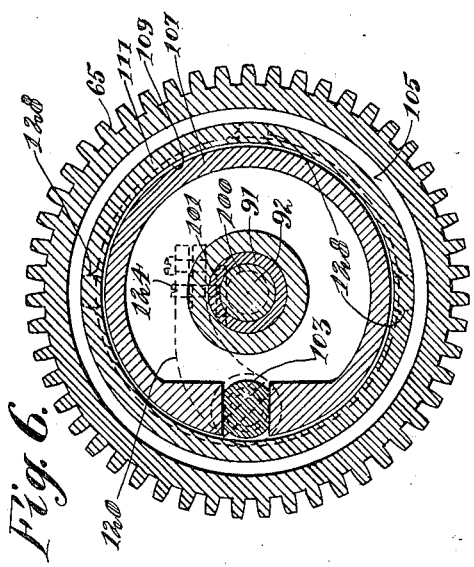
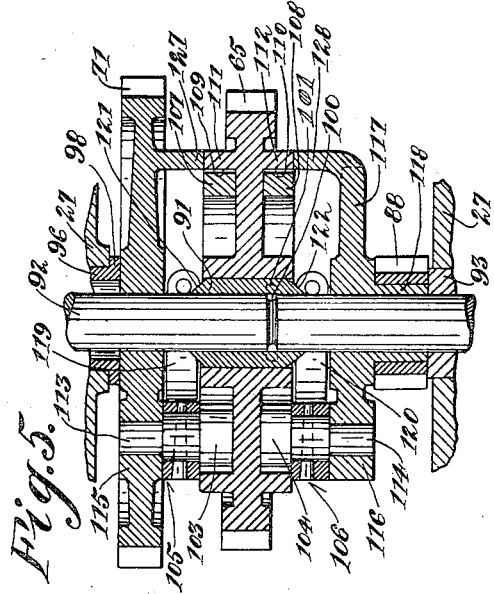

HERBERT L. BEELER, OF CINCINNATI, OHIO, ASSIGNOR TO THE JOHN B. MORRIS MACHINE TOOL COMPANY, OF CINCINNATI, OHIO, A CORPORATION OF OHIO.

LATHE.

1,124,262.

Specification of Letters Patent.

Patented Jan. 12, 1915.

Application filed October 30, 1911. Serial No. 657,458.

*To all whom it may concern:*

Be it known that I, HERBERT L. BEELER, a citizen of the United States, residing at Cincinnati, in the county of Hamilton and State of Ohio, have invented certain new and useful Improvements in Lathes, of which the following is a specification.

My invention relates to lathes, especially to means for moving the carriage longitudinally on the bed, and to means for moving the cross-slide crosswise on the carriage.

It is the object of my invention to provide novel means whereby the longitudinal feed or the cross-feed may be accomplished. It has been a usual practice in lathe mechanism, where power means are employed for accomplishing the longitudinal feed or the cross-feed, to clamp the power driving means to the rack-pinion shaft by means of a knurled hand-wheel, and to clamp the cross-feed screw to the power driving means, by means of a knurled hand-wheel in axial line with the cross-feed shaft, these knurled hand-wheels being clamped to the rotating parts and rotating with the driving elements to which they are clamped throughout the time that the power feed is operative. The speed of these hand-wheels is at times very great, especially during the high speeds maintained in connection with the employment of high-speed cutting tools, making it inconvenient and difficult, and at times impossible or dangerous for the operator to find and grasp the knurl or hand-wheel in order to stop the rotation thereof as quickly as desired or found imperative for the class of work being done, the connection for transmission of power being correspondingly difficult.

It is the object of my invention to overcome the difficulties stated, by providing an operating member for the cross-feed or the longitudinal feed which shall effect the operative connection of the cross-feed member or the longitudinal feed member with a power driving element, or disconnection thereof, and which is stationary during the power transmission effected thereby; further to provide a single manipulating element for effecting operative power relation in both the longitudinal feed and the cross-feed and arranged to remain stationary with relation to the carriage during such operative power relation; further to provide novel means for connecting the power applying element with the mechanism between the bed and carriage for moving the carriage longitudinally on the bed; and further to provide novel means for connecting the power applying element with the mechanism between the cross-slide and carriage for moving the cross-slide crosswise on the carriage, and the invention will be further readily understood from the following description and claims and from the drawings, in which latter:

Figure 1 is a front elevation of my improved device with the bed and the tool-post partly broken away. Fig. 2 is a vertical cross-section of the same on the line 2—2 of Fig. 1. Fig. 3 is a plan view of the same with the top of the carriage removed for better illustration of parts. Fig. 4 is a front elevation of the same partly in section on the irregular line 4—4 of Fig. 3. Fig. 5 is a bottom axial section, taken on the line 5—5 of Fig. 4, showing the clutch mechanisms and attendant parts. Fig. 6 is a cross-section of the same taken on a line corresponding to the line 6—6 of Fig. 3. Fig. 7 is a detail in section on a line corresponding to the line 7—7 of Fig. 2. Fig. 8 is a vertical section of the half-nut shifting mechanism, taken on the line 8—8 of Fig. 4; and, Fig. 9 is a cross-section of the same taken on a line corresponding to the line 9—9 of Fig. 8.

11 represents the bed of the lathe. 12 is the carriage, slidable longitudinally on the bed, as on usual guide-ways 13, and 14 is a cross-slide slidable crosswise on the carriage, as on guide-ways 15. The cross-slide is shown as having a tool-post 16 thereon, which supports a tool 17, and may be mounted on a slide-block 18, slidable in guide-ways 19 on a swivel-block 20, swiveling on the cross-slide. These parts may be of any suitable construction.

21 is a lead-screw suitably journaled in the machine and operated in any usual manner.

22, 23, are half-nuts arranged to engage with or to be released from the lead-screw, these half-nuts being on slides 24, 25, slidable in a guide-way 26 in the apron 27 of the carriage. The half-nuts are respectively provided with pins 28, 29, received in eccentric slots 30, 31, of a rocker-block 32, the stem 33 whereof is journaled in a bearing 34 and provided with an operating handle 35 between which and the bearing a spring 36 is located for frictionally positioning the rocker-block in its adjusted positions for maintaining the half-nuts in engaged or disengaged relation with the lead-screw.

41 is a feed-rod suitably journaled in the machine and operated in a usual manner.

42 is a sleeve which rotates with, but is slidable lengthwise of the feed-rod, as by means of spline-connection 43. The sleeve has thereon a pair of bevel-pinions 44, 45, arranged to selectively mesh with a bevel-gear 46 or to be placed in inactive relation to said bevel-gear. The sleeve is shiftable longitudinally with relation to the bevel-gear 46 for the purpose. It is preferably journaled for rotative and endwise movement in a bearing 40 on the apron. Means are provided for preventing such longitudinal shifting of the sleeve during operative engagement of the half-nuts with the lead-screw. Thus the sleeve is provided with an annular groove 47 in which a shoe 48 is received, the shoe being on a pin 49 swiveled in an arm 50 on a rock-shaft 51 to which an operating lever 52 is secured, the operating lever being provided with a locating pin 53 arranged to be received in selective holes 54 in the apron for positioning the sleeve in neutral position or in position for engaging either bevel-pinion 44, 45, with the bevel-gear 46.

The slide 25 of the half-nut 23 is provided with an opening 56 in which the arm 50 is received, the arm being provided with a locating lug 57 received in a locating recess 58 in the slide 25. When it is desired to move the half-nuts into engagement with the lead-screw, the slide 25 is moved toward the lead-screw for causing the walls of the recess 58 to be received about the lug 57, this movement being permitted only when the arm 50 is in neutral position, with both bevel-pinions 44, 45, disengaged. On the other hand, movement of the operating lever 52 is prevented while said slide is in raised position, that is to say, during engaged position of the half-nuts with the lead-screw. The construction prevents simultaneous engagement of the bevel-gear 46 and the lead-screw by the bevel-pinions and the half-nuts.

The bevel-gear 46 is secured to a shaft 61, journaled in bearings 62, 63, in the apron, the shaft having thereon a pinion 64 which meshes with a gear 65, through which motion is transmitted either to the longitudinal feed mechanism for the carriage, located between the bed and carriage, or to the cross-feed mechanism for the cross-slide, located between the cross-slide and the carriage, the first of these mechanisms being instanced as the rack 66 extending lengthwise on the bed and the rack-pinion 67 meshing therewith, and the second of these mechanisms being instanced as the cross-feed screw 68 journaled in the carriage and having threaded engagement with the cross-feed nut 69 secured to the cross-slide.

I will now describe the mechanism I prefer to employ for connecting the power driving means with said mechanism for longitudinal feed or said mechanism for cross-feed, my improved means preferably comprising an operating member for effecting connection of the final releasable power-transmitting means in the power transmitting train, and which remains stationary after said power transmission has been effected and during the transmission of power, so that said operating member is a non-moving part upon the carriage in convenient position for accomplishing engagement or disengagement of the power transmitting means. My improved device also presents a single operating member, which is normally stationary with relation to the carriage during inactive and operative relations thereof and by means of which power transmission may be rendered effective or released for either of said mechanisms for longitudinal or cross-feed.

I have illustrated a preferred means for accomplishing the purpose, but it is obvious that changes in construction and relations of parts may be made without departing from the spirit of my invention as defined by the annexed claims.

71 is a gear which meshes with a cross-feed pinion 72 on a hub 73 keyed, as at 74, to the cross-feed shaft 75 of the cross-feed screw, journaled in bearings 76 of the carriage. The rack-pinion 67 is secured to a shaft 80 journaled in eccentric bushings 81 adjustably located in bearings 82 of the apron, the shaft 80 having thereon a gear 83, which may, if desired, be meshed by a pinion 84 on a shaft 85 journaled in a bearing 86 of the apron and having a hand-wheel 87 thereon for manual turning of the rack-pinion. A handle 89 connects with the hub 73.

88 is a gear which meshes with the gear 83 and is arranged to operate said gear by power. The gears 65, 71 and 88 preferably have coincident rotary axes, and means are provided for selectively connecting said gear 65 with the gear 71 or with the gear 88 for selectively operating either the cross-feed pinion or the rack-pinion.

The gear 65 is rotatable loosely about a bushing 91, in turn received about a shaft 92, the shaft being shown as supporting said bushing and the gears 71 and 88. It is movable endwise and preferably has connection with a sleeve capable of being rocked. Thus it is located in a bearing 93 in which it has longitudinal movement, as by a spline-connection 94. The bearing is held stationary by a screw 90. It is provided with a spiral connection 95 with a sleeve 96, the spiral connection being shown in the form of high-pitch spiral ribs on the shaft, received in corresponding grooves in the sleeve. The sleeve is positioned endwise, as by being rockable in a bearing 97, and has a flange 98 at one end of said bearing, the other end of said sleeve having an operating handle 99 secured thereto, the bearing 97 being located between said flange and the hub of said handle. The turning of the handle will cause longitudinal moving of the shaft by reason of the spiral connection 95 and the spline-connection 94 for moving the bushing 91 endwise, the bushing being positioned lengthwise on said shaft by providing the shaft with an annular groove 100 in which a pin 101 in said bushing is received.

105, 106, are a pair of clutches between the gear 65 and the gears 71 and 88 respectively. These clutches are shown as friction-clutches and in the present exemplification comprise friction-bands 107, 108, normally spaced from, but arranged to be pressed against the internal friction-faces 109, 110, on the annular flanges 111, 112, on the gear 65.

113, 114, are a pair of rocker-pins journaled respectively in a bearing 115 in the web of the gear 71 and in a bearing 116 in a plate 117, to the hub 118 of which the gear 88 is secured, the gears 71 and 88 being loose about the shaft 92. The rocker-pins are provided with spreader-heads 103, 104, received between the ends of the friction-bands respectively, for spreading said ends and causing engagement between said friction-bands and their coacting internal friction-faces. 119, 120, are arms secured to said pins for rocking the same and arranged to be rocked by the movement of the shaft 92, bushing 91 being provided with inclined annular endfaces 121, 122, arranged to engage contact-screws 123, 124, adjustably secured in the swinging ends of the arms 119, 120.

If the operating handle 99 is moved in one direction for moving the shaft 92 in a given direction, one of the arms for the clutches will be rocked for causing operative power driving connection between the gears 65 and 71 for driving the cross-feed pinion, and if said operating handle is moved in the opposite direction for oppositely moving the shaft 92, the other rocker-arm will be rocked for operatively engaging the gear 65 with the rack-pinion 88 for causing longitudinal travel of the carriage. The parts will preferably maintain their operative relations when either of said clutches is engaged, as the contact-screws will then be located upon the high point or periphery of bushing 91, and the operating handle will consequently maintain its operative position, preferably a raised position, and be stationary upon the carriage throughout said operative connections. If it is desired to release the handle and bring the parts back to neutral position it is only necessary for the operator to strike the handle for throwing it down, the same being provided with a pull-pin 125 arranged to strike a lug 126 on the front of the apron for preventing the accidental shifting of the operating lever from a position of operative relation for cross-feed to operative relation for longitudinal feed, or vice versa, it being necessary to operate the pull-pin before a transfer of operative relations of the character stated can be accomplished.

For providing stability for the gear 65, I provide the gear 71 and the plate 117 respectively with spacing lugs 127, 128, arranged to respectively ride upon the side annular faces of the annular flanges 111, 112, on said gear 65, and these spacing lugs may act with the rocker-pins 113, 114, for distancing said gears and plate from each other.

Having thus fully described my invention, what I claim as new and desire to secure by Letters Patent, is:

1. In a lathe, the combination of a bed, a movable tool-supporting member supported by said bed and arranged to be fed, power-feeding means for feeding said member comprising a train of rotatable elements having a releasable power-transmitting connection in said train and embracing a rotatable member at said releasable connection, a longitudinally movable member for connecting said connection in said train and thereby rendering said feed active, said longitudinally movable member having a longitudinal axis coincident with the axis of rotation of said rotatable member, and a manually manipulated part for longitudinally moving said longitudinally movable member, said manually manipulated part and said longitudinally movable member remaining non-rotative while said feed is so active.

2. In a lathe, the combination of a bed, a movable tool-supporting member supported by said bed and arranged to be fed, power-feeding means for feeding said member embracing a train of rotatable elements having a releasable power-transmitting connection in said train and embracing a rotatable member at said releasable connection, and an operating member for connecting said connection in said train and thereby rendering said feed active, said operating member having an axis coincident with the axis of rotation of said rotatable member, said operating member comprising a manually manipulated part having a pivotal axis coincident with said axes of said rotatable member and of said operating member, and a part movable lengthwise of said axes for effecting said connection, and said manually manipulated part remaining non-rotative while said feed is so active.

3. A lathe embracing a bed, a carriage longitudinally movable thereon, a cross-slide movable crosswise on said carriage, and power-driving means for selectively causing said movements and embracing a train of rotatable elements having a releasable power-transmitting connection therein for each of said movements and embracing a rotatable member at said releasable connections, and an operating member for connecting said connections and thereby rendering said respective movements active and having an axis coincident with the axis of rotation of said rotatable member, said operating member comprising a manually manipulated part having a pivotal axis coincident with said axes of said rotatable member and of said operating member, and a part movable lengthwise of said axes for causing said respective movements through said respective power-transmitting connections, and said manually manipulated part remaining non-rotative on said carriage during connected relations of said releasable connections.

4. In a lathe, the combination of a bed, a carriage, a cross-slide, mechanism between said carriage and bed for moving said carriage longitudinally on said bed, mechanism between said cross-slide and carriage for moving said cross-slide crosswise on said carriage, each of said mechanisms comprising a gear, a rotatable member, and a single operating means for selectively connecting said rotatable member with either of said gears, a shaft, said gears and rotatable member having coincident axes of rotation and rotating about said shaft, and said single operating means and said shaft remaining stationary on said carriage during said connections.

5. In a lathe, the combination of a bed, a carriage, and a cross-slide, mechanism between said carriage and bed for moving said carriage longitudinally on said bed, mechanism between said cross-slide and carriage for moving said cross-slide crosswise on said carriage, each of said mechanisms comprising a gear, a rotatable member, clutches between said rotatable member and said gears respectively, a shaft, said gears and rotatable member having coincident axes of rotation and rotatable about said shaft, and a single operated member for operating both said clutches, and means for holding said operated member and said shaft stationary on said carriage during connected relations of said clutches for moving said carriage or cross-slide and during released relations of said clutches.

6. In a lathe, the combination of a bed, a carriage, and a cross-slide, mechanism between said carriage and bed for moving said carriage longitudinally on said bed, mechanism between said cross-slide and carriage for moving said cross-slide crosswise on said carriage, a rotatable member, clutches between said rotatable member and said named mechanisms respectively, a longitudinally movable shaft and clutch engaging means therefor for said clutches, said rotatable member and clutches rotatable about said shaft, and means for preventing rotation of said shaft during engaged relations of said clutches and movements respectively of said carriage and cross-slide.

7. In a lathe, the combination of a bed, a carriage, and a cross-slide, mechanism between said carriage and bed for moving said carriage longitudinally on said bed, mechanism between said cross-slide and carriage for moving said cross-slide crosswise on said carriage, a rotatable member, clutches between said rotatable member and said named mechanisms respectively, and clutch-operating means embracing a non-rotatable and longitudinally movable element and a rotatable and longitudinally fixed element having spiral projection and groove connection therebetween, said rotatable member and clutches rotatable with relation to and about one of said last-named elements during connected relations of said clutches and movements respectively of said carriage and cross-slide.

8. In a lathe, the combination of a bed, a carriage, a cross-slide, a driving gear, a driven gear at each end of said driving gear, a friction-clutch between said driving gear and each of said driven gears, a shaft about which said gears are rotatably mounted, the axis of rotation of said gears and friction-clutches and the axes of said shaft being coincident, mechanism between said carriage and bed for moving said carriage longitudinally on said bed, mechanism between said cross-slide and carriage for moving said cross-slide crosswise on said carriage, said mechanisms respectively having operative connections with said driven gears, said shaft provided with means for selectively operating said friction-clutches, and a single manually operated member having connection with said shaft for shifting said shaft and thereby operating said last-named means, said manually operated member and said shaft remaining stationary on said carriage during connected relations of said respective clutches and said movements respectively of said carriage and cross-slide.

In testimony whereof, I have hereunto signed my name in the presence of two subscribing witnesses.

HERBERT L. BEELER.

Witnesses:
JACOB A. HOLLANDER,
C. TATGENHORST, Jr.